US011982106B2

(12) United States Patent
Silver

(10) Patent No.: US 11,982,106 B2
(45) Date of Patent: May 14, 2024

(54) METHOD FOR CONTROLLING ROTATION OF DUAL CONCENTRIC CYLINDER PIN-TUMBLER LOCK

(71) Applicant: Jonathan Jared Silver, Lemon Grove, CA (US)

(72) Inventor: Jonathan Jared Silver, Lemon Grove, CA (US)

( * ) Notice: Subject to any disclaimer, the term of this patent is extended or adjusted under 35 U.S.C. 154(b) by 324 days.

(21) Appl. No.: 17/555,410

(22) Filed: Dec. 18, 2021

(65) Prior Publication Data

US 2023/0193656 A1 Jun. 22, 2023

(51) Int. Cl.
*E05B 27/00* (2006.01)
*E05B 17/04* (2006.01)

(52) U.S. Cl.
CPC ........ *E05B 27/0075* (2013.01); *E05B 17/045* (2013.01); *E05B 17/047* (2013.01); *E05B 27/001* (2013.01); *E05B 27/0017* (2013.01)

(58) Field of Classification Search
CPC ............... E05B 27/001; E05B 27/0075; E05B 27/0053; E05B 35/08; E05B 35/10; E05B 35/105; E05B 27/0017; E05B 17/04; E05B 17/041; E05B 17/042; E05B 17/044; E05B 17/045; E05B 17/047
See application file for complete search history.

(56) References Cited

U.S. PATENT DOCUMENTS 31,278 A * 1/1861 Yale, Jr. .................. E05B 65/46 70/403
48,476 A * 6/1865 Yale, Jr. .................. B23B 39/12 408/128
1,135,027 A * 4/1915 Kohlberger ......... E05B 27/0053 70/341
2,748,915 A * 6/1956 Byrnes, Jr. .............. G07F 17/14 194/234
3,943,739 A * 3/1976 Genakis .............. E05B 27/0053 70/419
5,060,494 A * 10/1991 Moorhouse ........... E05B 27/001 70/419
5,799,519 A * 9/1998 Hsiao .................... E05B 27/005 70/358
5,921,121 A * 7/1999 Tang ................... E05B 27/0053 70/382
5,964,111 A * 10/1999 Lambert ............... E05B 27/083 70/381
2017/0321450 A1* 11/2017 Trent .................. E05B 47/0611

* cited by examiner

*Primary Examiner* — Christine M Mills
*Assistant Examiner* — Peter H Watson

(57) ABSTRACT

A pick resistant lock assembly has two lock sections which can be opened in two stages separated by time using a single key. The first locked section is rotated slightly by the use of the key, whereupon the second locked member is released from being locked by the isolated stack of locking pin tumblers and is then also made connective to the first lock section by a gear connective to the lock housing such that the first lock section and second lock section can then be rotated together, but only if the selectively machined key had been used in the beginning, else further rotation of either member is prevented by the multiple stacks of locking pin tumblers that are common to both.

1 Claim, 2 Drawing Sheets

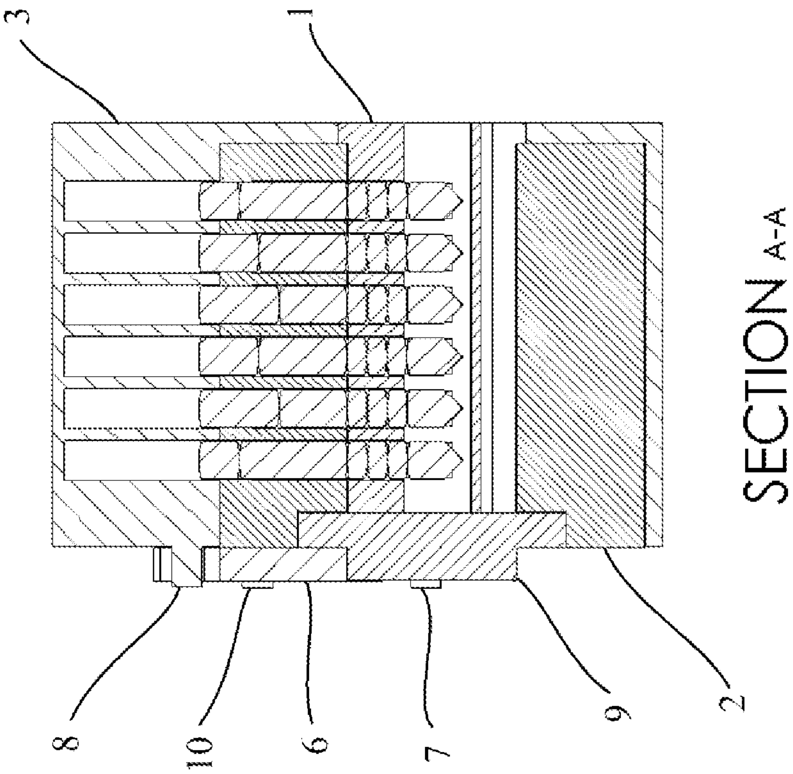
FIG. 2
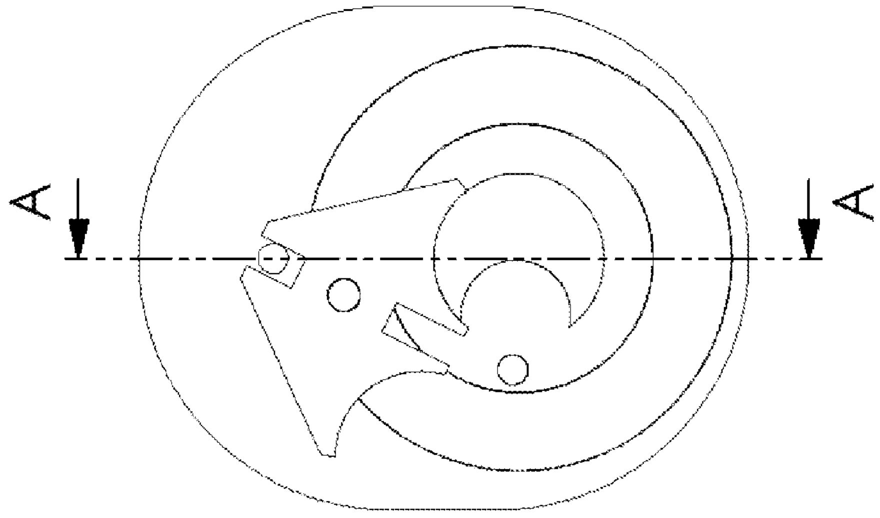

METHOD FOR CONTROLLING ROTATION OF DUAL CONCENTRIC CYLINDER PIN-TUMBLER LOCK

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

This invention relates to pin-tumbler locks that are pick-resistant, and more particularly to pin-tumbler locks of the concentric cylinder type that include defensive means to resist picking.

Pin-tumbler locks of the concentric cylinder type of the prior art are described and shown in the early patents of Linus Yale (U.S. Pat. No. 31,278 and U.S. Pat. No. 48,476). A typical pin-tumbler, key-operated, cylinder lock is opened by a key that raises each pin stack within the lock until the bottom of the top pin of each stack lines up with the common circumferential surfaces of an inner cylinder and an outer housing bore. When all pin stacks are thus aligned, the key can rotate the inner cylinder and thereby operate any number of mechanisms attached to the far end of that cylinder or cammed by it.

Prior art structure of a pin-tumbler lock that uses a second cylinder concentric to a first for the purpose of prevention from being picked, manipulated, or impressioned to an unlocked state without the use of its provided key is set forth by Lambert in U.S. Pat. No. 5,964,111A. Grooves are cut into components of the lock to ensure proper operation should the user rotate in one direction and reverse direction of rotation prior to reaching the full range of motion. Further, to the uninitiated user, there seems to be a left of center "clicking" point, and a right of center "clicking" point, which occurs at the angles of rotating the inner cylinder through the range of the cam, and is distinctly different feel than the operation of a typical pin-tumbler, key-operated, cylinder lock.

As such it may be appreciated that there continues to be a need to improve the operation of secure pin-tumbler locks of a dual concentric cylinder type as set forth by the instant invention which addresses the problem of ease of construction and intuitive operation.

BRIEF SUMMARY OF THE INVENTION

An object of this invention is to provide timing of operation for a pin-tumbler lock in which neither a rotating nor probing force can be applied simultaneously with manipulation of pin stack elements. The instant invention improves control over timing of operation of such locks by dedicating a gear to translate a continuous rotation movement of the first stage rotating member into intermittent rotary motion of the second stage rotating member required to unlock it. The gear improves the tactile feel of operation as experienced by the user, and simplifies the number of parts and processes required for construction.

BRIEF DESCRIPTION OF THE SEVERAL VIEWS OF THE DRAWING

FIG. 2 is a sectional view of the concentric cylinder type of pin-tumbler lock of this invention.

DETAILED DESCRIPTION OF THE INVENTION

Figure 1:
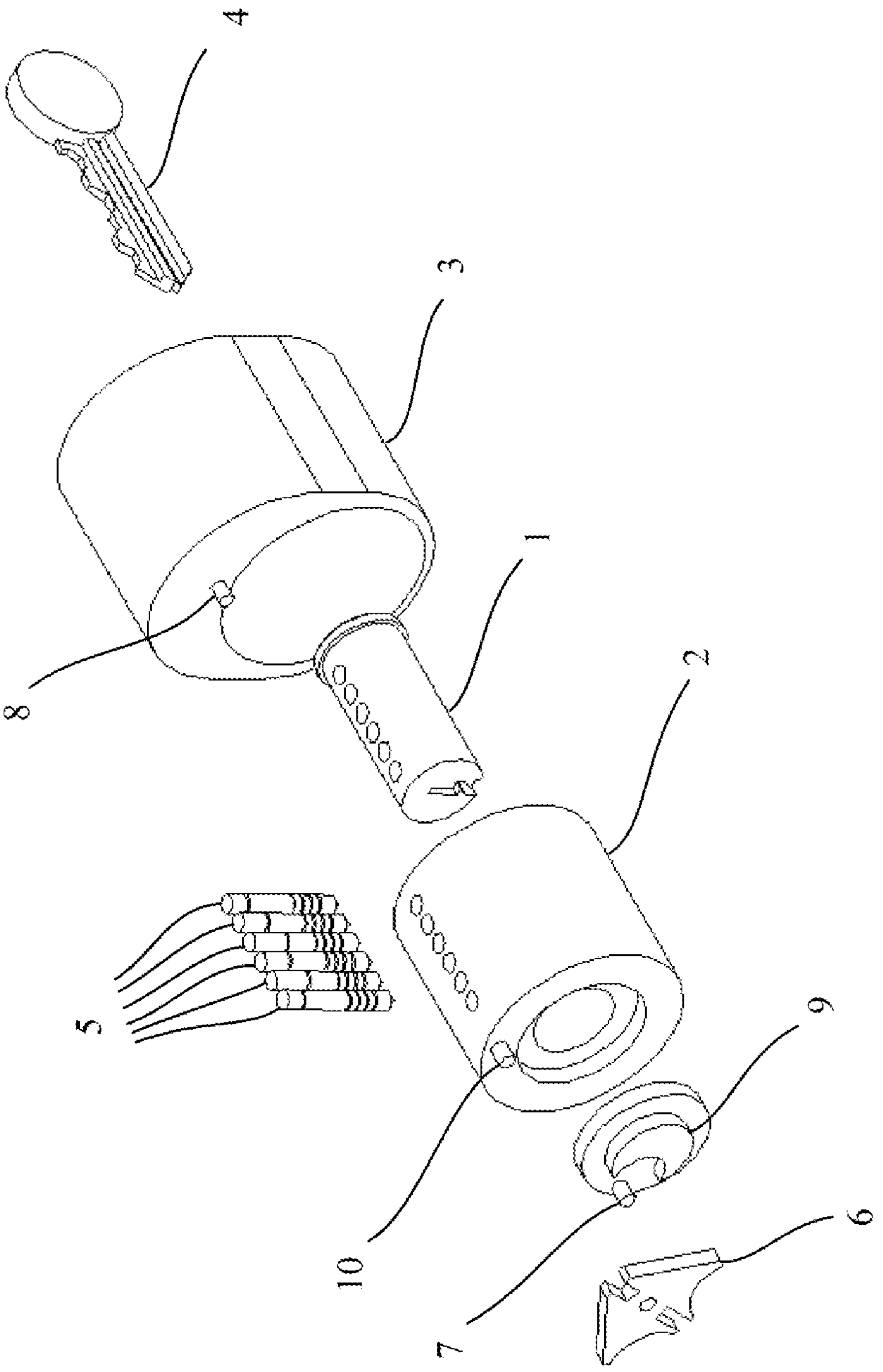
FIG. 1 is an exploded view of the concentric cylinders type of pin-tumbler lock of this invention.

Outer housing 3 is expected to be mounted solidly to the barrier being locked or part of the barrier itself so that it is the reference frame within which the other components move. In the starting position, key 4 is not inserted and locking pin stacks 5 are all in alignment.

Once the key 4 is inserted into inner cylinder 1, the locking pin stacks 5 line up so with the break line between inner cylinder 1 and intermediate cylinder 2, and any rotation of the key 4 will cause rotation of inner cylinder 1 directly and independent of intermediate cylinder 2 and outer housing 3 until there is no longer overlap between the portion of pin stacks 5 located within inner cylinder 1 and the portion of pin stacks 5 located within intermediate cylinder 2. Independent rotation between inner cylinder 1 and intermediate cylinder 2 occurs when the gear 6 first arcuate recess and cam 9 are lined in a way so that they are concentric with one another. This change in relative angle misaligns the locking pin bores so as to preclude any further probing manipulation of the locking pin stacks 5 in order to change their position within intermediate cylinder 2, or outer housing 3. Once this motion has been achieved, gear drive pin 7 engages with the gear 6 radially outwardly opening slot. If the locking pin stacks 5 line up so with the break line between intermediate cylinder 2 and outer housing 3, the continued rotation of the key 4 in the same direction will continue to cause a rotation of inner cylinder 1 and start actuation of gear 6. Gear 6 has its axis of rotation affixed to intermediate cylinder 2 by way of gear pin 10 and a generally radial slot in the gear 6 is in contact with gear fulcrum pin 8 located on the outer housing 3. Thus, further rotation of inner cylinder 1 will cause rotation of gear 6 which will cause intermediate cylinder 2 to rotate in the same direction in relation to inner cylinder 1. If the rotation of inner cylinder 1 is continued in this direction, once gear 6 second arcuate recess and cam 9 are lined in a way so that they are concentric with one another, gear drive pin 7 is no longer in contact with gear 6, causing rotation of intermediate cylinder 2 to be halted and the rotation of inner cylinder 1 may be continued independent of intermediate cylinder 2 and outer housing 3. The rotation of inner cylinder 1 may be continued.

At this position, rotation of the key 4 in the opposite direction may occur and will directly drive inner cylinder 1 independently of intermediate cylinder 2 and outer housing 3 until gear drive pin 7 is again in contact with gear 6. When this position is achieved, gear drive pin 7 again engages with gear 6 radially outwardly opening slot. The continued rotation of the key 4 in the same direction will continue to cause a rotation of inner cylinder 1 and will cause rotation of gear 6 which will cause intermediate cylinder 2 to rotate in the same direction in relation to inner cylinder 1. If the rotation of inner cylinder 1 is continued, once gear 6 first arcuate recess and cam 9 are lined in a way so that they are concentric with one another, gear drive pin 7 is again no longer in contact with gear 6, causing rotation of intermediate cylinder 2 to be halted and the rotation of inner cylinder 1 may be continued independent of intermediate cylinder 2 and outer housing 3. The rotation of inner cylinder 1 may be continued until the locking pin stacks 5 are in alignment.

From the starting position, once the key 4 is inserted into inner cylinder 1, the initial rotation of the key 4 in the opposite direction as before will cause rotation of inner cylinder 1 directly and independent of intermediate cylinder 2 and outer housing 3.

What is claimed is:

1. A lock assembly, comprising:

an outer housing having a bored cylindrical cavity;

an intermediate cylinder having a diameter to rotatably fit the bored cylindrical cavity of the outer housing, and a longitudinally, concentrically bored cylindrical cavity;

an inner cylinder having a diameter to rotatably fit the longitudinally and concentrically bored cylindrical cavity of the intermediate cylinder;

a gear having a generally radial slot, a first arcuate recess, a radially outwardly opening slot, and a second arcuate recess, arranged in a circumferential direction thereof;

a provision to rotatably fit the gear to the intermediate cylinder;

a fulcrum pin attached to or part of the outer housing with a diameter to slidably fit the generally radial slot, located to ensure engagement with the generally radial slot at all times, a gear drive pin attached to or part of the inner cylinder with a diameter to slidably fit the radially outwardly opening slot, located to ensure engagement with the radially outwardly opening slot when rotation of the inner cylinder within the intermediate cylinder positions the gear drive pin into physical contact with the gear;

a cam attached to or part of the inner cylinder having a profile to fit the first arcuate recess and the second arcuate recess, oriented so the profile is concentrically aligned with the inner cylinder, located to ensure engagement with the first arcuate recess or the second arcuate recess when rotation of the inner cylinder positions the gear drive pin out of physical contact with the gear, and with a recess around the gear drive pin to allow for movement of the radially outwardly opening slot around the gear drive pin.

* * * * *